United States Patent
Ribeiro De Oliveira et al.

(10) Patent No.: US 11,070,869 B2
(45) Date of Patent: Jul. 20, 2021

(54) METHOD FOR CONTROLLING INTERNET OF THINGS DEVICES WITH DIGITAL TV RECEIVERS USING TRANSMISSION FROM A BROADCASTER IN A TRANSPORT STREAM FLOW

(71) Applicant: SAMSUNG ELETRÔNICA DA AMAZÔNIA LTDA., São Paulo (BR)

(72) Inventors: Rodrigo Ribeiro De Oliveira, Manaus (BR); Danny Fabiano Farias Costa, Manaus (BR)

(73) Assignee: SAMSUNG ELETRÔNICA DA AMAZÔNIA LTDA., São Paulo (BR)

( * ) Notice: Subject to any disclaimer, the term of this patent is extended or adjusted under 35 U.S.C. 154(b) by 0 days.

(21) Appl. No.: 16/375,489

(22) Filed: Apr. 4, 2019

(65) Prior Publication Data
US 2020/0169782 A1    May 28, 2020

(30) Foreign Application Priority Data
Nov. 28, 2018    (BR) ...................... 10 2018 074626 0

(51) Int. Cl.
*H04N 21/4363*    (2011.01)
*H04N 21/41*    (2011.01)
*H04N 5/50*    (2006.01)

(52) U.S. Cl.
CPC ......... *H04N 21/43637* (2013.01); *H04N 5/50* (2013.01); *H04N 21/4126* (2013.01)

(58) Field of Classification Search
None
See application file for complete search history.

(56) References Cited

U.S. PATENT DOCUMENTS

| | | | |
|---|---|---|---|
| 7,755,506 B1 | 7/2010 | Clegg et al. | |
| 8,120,637 B2 | 2/2012 | Baird | |
| 8,724,639 B2 | 5/2014 | Mahmoud | |
| 2009/0061769 A1* | 3/2009 | Zimbric | H04M 1/7253 455/41.2 |
| 2009/0271815 A1* | 10/2009 | Contin | G06Q 30/06 725/31 |
| 2011/0032423 A1 | 2/2011 | Jing et al. | |
| 2012/0127268 A1 | 5/2012 | Yun et al. | |
| 2016/0073155 A1* | 3/2016 | Subramaniam | H04N 21/4316 725/32 |
| 2017/0347427 A1* | 11/2017 | Cole | H04N 21/4131 |
| 2019/0028872 A1* | 1/2019 | Ms | H04W 76/14 |
| 2019/0166674 A1* | 5/2019 | Mason | H04N 21/42202 |

* cited by examiner

*Primary Examiner* — Jason K Lin

(57) ABSTRACT

Method to control IoT devices (e.g. smart lamps, smart air conditioner, etc.) through a smart DTV device. Main control is synchronized with the video scene of the transport stream (open/cable/satellite DTV channel) through data added by broadcaster. The broadcaster chooses the desired IoT devices that will be controlled by the channel and the effects that will be reproduced on all devices. The broadcaster can use some multiplexing tool to add the commands synchronized with the desirable video scene together with the other data present at TS flow. The broadcaster datacasts certain data to all home DTV appliances or receivers tuned to that channel. In the receiver side, this data is filtered, processed and transmitted to all IoT devices on the home network and, also paired with the TV receiver.

6 Claims, 3 Drawing Sheets

METHOD FOR CONTROLLING INTERNET OF THINGS DEVICES WITH DIGITAL TV RECEIVERS USING TRANSMISSION FROM A BROADCASTER IN A TRANSPORT STREAM FLOW

CROSS-REFERENCE TO RELATED APPLICATION

This application claims the priority benefit of Brazilian Patent Application No. 10 2018 074626 0, filed on Nov. 28, 2018, in the Brazilian Intellectual Property Office, the disclosure of which is incorporated herein by reference.

TECHNICAL FIELD

The present method of invention is related to the telecommunication field of technology. More specifically it describes a method to control IoT devices (e.g. smart lamps, robotic seats, smart air conditioned, wearable devices, etc.) through a smart DTV device.

BACKGROUND

The technology of Internet of Things (IoT) in its current state allows to connect everything. These things can communicate with each other switching data through smart and fast communication protocols commonly used at the technology market through personal devices or home/industrial devices. Nowadays the mobile devices can connect with TV devices and other home equipment to control, or even, share data, such as, text files, video and audio media, pictures, applications, remote control, etc. Thus, communication between home devices is converging to the development of intelligent environments where any device can control, be controlled or communicate with everything. Commonly, TV devices are used to watch high-definition television (HDTV) content. Actually, smart TV devices may navigate at the internet, decode different types of media, access an application store with different kinds of apps, and exchange data with mobile devices, etc.

However, the interactive features provided by new standards of digital TVs can be also used to improve the viewer experience. The DTV signal or, commonly called TS, is not totally exploited by broadcasters concerning the use of interactive features and data broadcasting mechanisms provided by all Digital TV standards. Despite this, there is an opportunity to develop methods combining the features of data broadcast mechanisms, available at the DTV system, with the smart and fast communication protocols available at IoT devices. This combination would generate a way to control IoT devices based on the broadcaster signal TV. Thus, the TV home appliance could send control commands to IoT devices synchronized with the broadcaster programs. From the broadcaster side no changes are required because the infrastructure is already prepared to broadcast any kind of data based in a TS. The main requirements from broadcaster side are adding the synchronized IoT control data (text data) in order to allow the DTV receivers to filter these data and use them to control the IoT devices.

MPEG2-TS is a well-defined technology for transmitting or recording video data. It can be used with many different video compression standards such as MPEG-2, MPEG-4, and H.264. Multiple video, audio or data streams are allowed in a single TS. In order to perform the intermedia synchronization some types of time stamps are also defined in the TS standard. These time stamps are transmitted in TS to allow the synchronization of elementary streams, such as, audio, video and subtitles/data. The Presentation Time Stamp (PTS) and Decoding Time Stamp (DTS) are given either in units related to a program's overall clock reference, or Program Clock Reference (PCR) which is also transmitted in the TS. These time stamps are inserted close to the material to which they refer. The receiver uses these time stamps to perform inter-media and intra-media synchronization. In this proposal, the time stamp values will be the reference data in order to synchronize the IoT commands with the broadcast video stream content. Similar technique, is used by a closed-caption channel in order to synchronize the subtitles with the video/audio streams. There are different ways to broadcast the IoT commands (e.g. text data) based at digital TV technology standard, such as, Packetized Elementary Stream (PES) packets, private sections, closed-caption channel, Digital Storage Media Command and Control (DSM-CC) stream events, etc. All these techniques are used by broadcasters to transmit some types of data and could be used by broadcasters to transmit IoT commands. The PES packet is considered a good option if the receiver is already prepared to filter this content and the PTS and DTS values are on header of each PES packet. If private sections are used, it is necessary to add the time stamps (PTS and DTS) values together with the IoT commands content for each private section used. In this case, the receiver needs at first to parse/filter time stamps data in order to use those data to synchronize the transmission of IoT commands with the video stream flow. Other option consists in using an available closed-caption channel. In this case, the broadcaster data inserter follows the same idea of subtitle insertion, but in this case, using IoT commands instead of subtitles. One last option would be the use of complex DSM-CC stream events. DSM-CC requires a complex implementation from receiver side and is already used to send events, data and interactive applications to most part of DTV systems in the world. The use of stream events to send IoT commands may require adaptations on DTV standard.

Although all presented techniques can be used by Broadcasters to transmit IoT commands using a MPEG-TS, the present invention recommends the use of PES packets to transmit the IoT commands aiming to use the same broadcaster/receiver's infrastructure compatible with the most DTV systems.

In the current state of art, the following solutions and technologies enable the implementation (technical feasibility) of similar proposals:

1. MPEG2-TS—is an audio, video and data broadcasting protocol that is specified in MPEG layer 2. Through MPEG2-TS the DTV system performs content signaling and application datacasting commonly used at interoperability layers (e.g. Ginga, Multimedia Home Platform—MHP, Association of Radio Industries and Business (ARIB), Integrated Broadcast-Broadband (IBB), etc.) to reproduce interactive contents.

2. DTV technology—The digital TV systems contemplate a set of technical standards and rules with the characteristics of the DTV signal (e.g. Advanced Television System Committee—ATSC, Integrated Services Digital Broadcasting—ISDB, Digital Video Broadcasting—DVB, Brazilian Digital TV System—SBTVD, etc.) in order to standardize communications between broadcasters and receivers.

3. Bluetooth—a wireless technology used to exchange data in short distances. It is used to control IoT devices located near the TV device.

4. All Share—a communication protocol that allows to exchange data between TV devices and IoT devices through home network.

5. Smart Home Software Protocol (SHP)—Generic control protocol to IoT devices used to communicate the TV device with generic IoT devices reached at the home network.

Furthermore, the following solutions present similarities with the present invention but are technically different, or have different objectives/purposes:

The patent document U.S. Pat. No. 8,724,639 B2, titled "SMART HOME HUB", filed on Feb. 26, 2010, proposes a smart hub focused on the control of devices with the creation of a multicast environment that consists of the delivery of information (audio/video) to multiple recipients simultaneously to the use of home network and thus, allowing the management of telephone calls via IP, change of TV channel, selection of video and audio in TVs, control of video games, etc. Document U.S. Pat. No. 8,724,639 differs from the present invention because the control methodology of the present invention is based on TV signal (Moving Picture Experts Group—MPEG2—Transport Stream—MPEG2-TS or simply TS), wherein TV device filters these broadcast commands, process, validate and retransmit them to IoT devices paired with TV receiver. According to the method of the present invention, the sync control is based on TV signal. If no IoT device is paired with TV or the TV resident application is disabled by user preferences, the broadcast content is ignored.

The patent document U.S. Pat. No. 8,120,637 B2, titled "VIRTUAL THEATHER SYSTEM FOR THE HOME", filed on Feb. 21, 2012, describes a system that includes a mixer that creates customized mixed audio streams by synchronously mixing audience reaction data packets received from a plurality of virtual theater nodes with a soundtrack of a movie. The audience reaction data packets are produced by viewers watching the movie. The mixer transmits each customized mixed audio streams to a corresponding one of the virtual theater nodes. A video streamer streams video data packets to each of the virtual theater nodes, the video data packets being synchronized with each of the customized mixed audio streams. Although document U.S. Pat. No. 8,120,637 mentions the filtering of audio packets for sound effects, similarly to the present invention, it differs from the method of the present invention in that the method of present invention uses a Digital TV mechanism (e.g. available closed-caption channel, private sections or packetized elementary stream (PES) packages) to send IoT commands (synchronized with video) via the TV station. These commands will be used to synchronize/produce effects on external devices, not only based on the sound sensation but also based on the visual or physical sensation, etc.

The patent document KR 10-1497965 B1, titled "METHOD FOR CONTROLLING HOME CINEMA BY EXTERNAL RESOURCE SHARING", filed on Nov. 27, 2014, describes the control of external devices (such as: massage chair, lamps, fans, etc.) through media video or movie. Thereby the external devices are designated to these functions, but document KR 10/1497965 does not disclose how it works or how the communication between then happen. The main difference between document KR 10/1497965 and the present invention is that in the method of the present invention, the DTV broadcaster controls the IoT devices, sending IoT commands through TS. The TV device filters these control commands and sends them to compatible IoT devices reached at the home network. Therefore, the method of the present invention uses the own IoT protocol of TV device.

The patent document US 2011/0032423 A1, titled "ADAPTIVE USER PROFILING FOR TV-CENTRIC HOME AUTOMATION SYSTEM", published on Feb. 10, 2011, describes the TV device as the main control source of home devices (e.g. air conditioner, lamps, sounds, etc.). In this case the control being made by user and it does not mention entertainment interaction associated with the TV content. The main difference between document US 2011/0032423 and the present invention is that the method of the present invention associates the control with the video scene to improve the user experience and the main control comes from DTV broadcaster to be delivered to all home IoT devices through home network using TV device.

The patent document CN 205121198 U, titled "INTELLIGENT HOME CINEMA AND HYPERSYSTEM", published on Mar. 30, 2016, discloses the smart prepare of an environment (e.g. room, living room, movie theater, etc.) to watch movies the best possible way. Thus, the apparatus closes the curtains, turn off the lights and prepare the environment for the best user accommodation. To achieve this goal, the apparatus considers using own devices proposed in this patent. The main difference related to the present invention is that the method of document CN 205121198 focuses on environment preparation and there isn't continuous interaction with the broadcast content.

The patent document U.S. Pat. No. 7,755,506 B1 aims to control several devices at home using wireless network (e.g. Wi-Fi, IR, etc.). To achieve this, it is necessary to connect a receiver in each home device to be controlled. The main difference of the present invention consists in the automatic way to control devices through IoT protocol communication. The present invention allows to control any IoT devices reached at home network. Thus, it is not necessary to make any adaptations to device works. The control based on a TS allows to develop any kind of control using different IoT devices. Thus, the present invention aims to provide a way to help user to immerse at the DTV program reproducing broadcasting synchronized effects at the IoT devices reached at the home network.

The patent document US 2012/0127268 A1, titled "METHOD AND APPARATUS FOR CONTROLLING BROADCASTING NETWORK AND HOME NETWORK FOR 4D BROADCASTING SERVICE", filed on Nov. 18, 2011, is focused at processing realistic effect data related with 3D images. The information (e.g. realistic effects) necessary to control home devices creating a 4D broadcasting service are encoded at 3D media content during content creation (media creation). The 3D image generation is based on extra external sensors required (e.g. capture inputs from environment) necessary to add/associate realistic commands on 3D media content. On receiver side is necessary a robust image processor to extracts the realistic effects from 3D image content and perform synchronization. Differently, the present invention is not based at 3D media content and uses the MPEG2-TS standard to add the control commands (data inserter on broadcaster side) with any change on media contents. Thus, the method of the present invention works with 2D image (and any media types, for example) because it uses only the datacasting mechanisms of MPEG2-TS to add new metadata (e.g. effects commands). Our proposal is media independent. The synchronization is based at timestamps (PTS, DTS and PCR) already provided at DTV signal during transmission of regular DTV content. These timestamps are required to perform intermedia and intramedia synchronization (e.g. closed-caption). Document US20120127268A1 also uses a specific/dedicated device as a receiver (home server—106), which split/de-multiplexing audio/video content and device actions.

SUMMARY OF THE INVENTION

The method of present invention is related to the telecommunications technological field. More specifically, it describes a method to control IoT devices (e.g. smart lamps, robotic seats, smart air conditioner, wearable devices, etc.) through a smart DTV device. The main control is synchronized with the video scene of the Transport Stream (open/cable/satellite DTV channel) through data added by broadcaster. To achieve this, the broadcaster chooses the desired IoT devices that will be controlled by the channel and the effects that will be reproduced on all devices. Thereafter, the broadcaster uses some multiplexing tool to add the commands synchronized with the desirable video scene together with the other data present at the Transport Stream flow. These tools are commonly used by broadcasters to insert information about subtitles, text or even proprietary data to broadcast content. After this step, the broadcaster datacasts those data to all home DTV appliances or receivers tuned to that channel. In receiver side, these data are filtered, processed and transmitted to all IoT devices reached at home network and, also paired with the TV appliance.

One example of possible effects is that related with producing visual effects with smart lamps, such as, flashing, dimming, lighten, turn off, turn on, color change, etc. To achieve this, the set of commands sent by broadcaster indicate production of effects related with lamps according with the desired sensation for user experience. Other example is related with robotic seats that could have several kinds of effects, such as, vibrate, lean left, lean right, come down, move up, recline, etc. In this case, the broadcaster will add commands to generate effects also to control robotic seats. Another way is to send commands to control smart air-conditioner, such as, turning on, turning off, raise the temperature, lower temperature, etc., which represents other interesting device to include between the home entertainment devices controlled by DTV device. The commands usually arrive interleaved inside the transport stream making possible to control several kinds of IoT devices managed by the same transport stream. The idea is supporting several kinds of IoT devices, being responsibility of each manufacturer to develop the resident application to run at TV device and it is up to the user to define which IoT device must be controlled, always having the option to disable them whenever he wants. This application needs to filter the de-multiplexed tuner data, process and multicast the extracted data to all IoT devices connected at home network.

Based on the drawbacks described by the current prior art, the following advantages to use the Method for Synchronized Driving of IoT Devices Using Transmission in transport stream format are as follows:

It creates a home entertainment environment controlled by TV devices;
It uses the digital TV open signal content to control IoT devices;
It fosters the development of a new line of home entertainment products as TV accessories;
It improves the user experience turning more exciting the leisure time in front a television;
It improves the use of digital TV signal band;
It expands smart TV features;
It increases the sales of smart TVs;
It helps the broadcaster to increase the audience;
It can be easily disabled/enabled by user through the user preferences TV app;
It can easily disable the IoT device on TV just by removing it from the list of paired devices;
It doesn't require any changes at DTV standards;
It helps to leverage smart things tech of smart TVs;
It doesn't imply to change anything to maintain the standard legacy.

BRIEF DESCRIPTION OF THE DRAWINGS

The objectives and advantages of the current invention will become clearer through the following detailed description of the example and non-limitative drawings presented at the end of this document.

DETAILED DESCRIPTION

Figure 1:
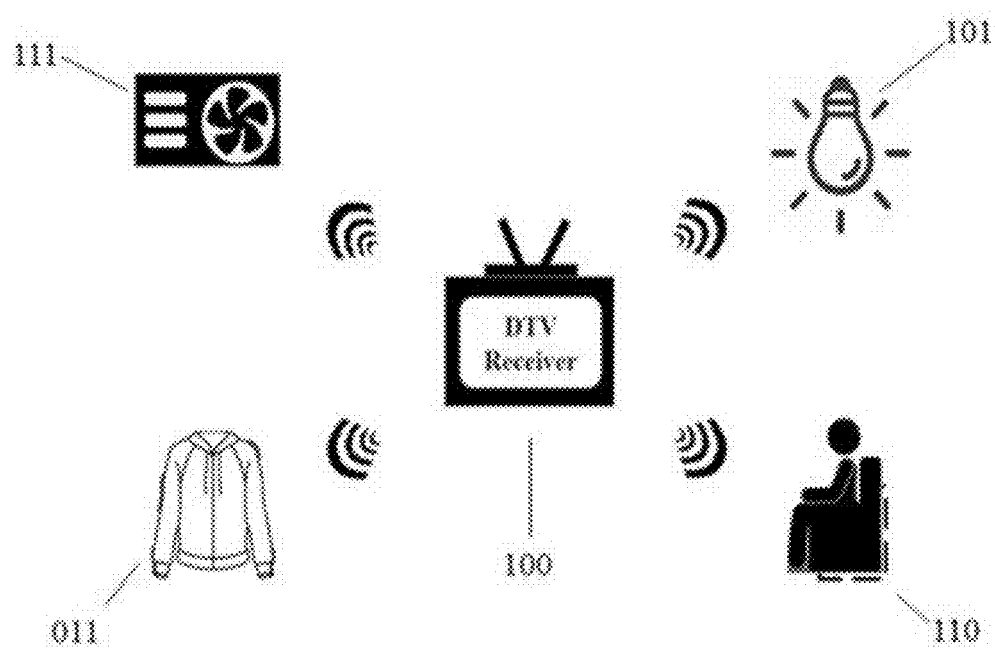
FIG. 1 discloses some examples of hypothetical home IoT devices being controlled by DTV device.

According to the FIG. 1, devices 101, 110, 011 and 111 react to commands sent by device 100. The device 101 is represented by a hypothetical smart lamp (SL) reacting to the following command list:
{!SL_Flashing[%value]!};
{!SL_Dimming[%value]!};
{!SL_Lighten[%value]!};
{!SL_Turn_Off!};
{!SL_Turn_On!};
{!SL_Color[%value_blue,%value_green,%value_red]!}.

The device 110 is another example of a hypothetical robotic seat (RS) reacting to the following command list:
{!RS_Shake[%value]!};
{!RS_Let_Down[%value]!};
{!RS_Let_Up[%value]!};
{!RS_Lean_Right[%value]!};
{!RS_Lean_Left[%value]!};
{!RS_Recline_Up[%value]!};
{!RS_Recline_Down[%value]!};

The device 011 is also another hypothetical wearable device (WD) reacting to the following command list:
{!WD_Shake[%value]!};
{!WD_Heat[%value]!};
{!WD_Cool_Down[%value]!};
{!WD_Hold_Tight[%value]!};
{!WD_Slacken[%value]!}.

Finally, the device 111 is a hypothetical smart air conditioner (AC) reacting to the following command list:
{!AC_Turn_On!};
{!AC_Turn_Off!};
{!AC_Cool_Down[%value]!};
{!AC_Cool_Up[%value]!};
{!AC_To_Heat[%value]!};
{!AC_Turbo_Fan[%value]!}.

The method of the present invention extracts the IoT commands showed above, filtering PES packets of the tuned DTV channel (TS) concurrently with other tasks, such as, audio and video decoding and data filtering. The transport stream content filtering tasks are normally performed by any DTV system. The PES packets filtering follows continuously until the user changes to other channel, or turns off the TV device, or even disables this feature through the TV resident application. After the tuning with other channel, the resident application checks if there are IoT commands at the signal. If true, the filtering/control process follows, otherwise, the resident application keeps waiting the arrival of IoT commands in a continuous verification process.

Figure 2:
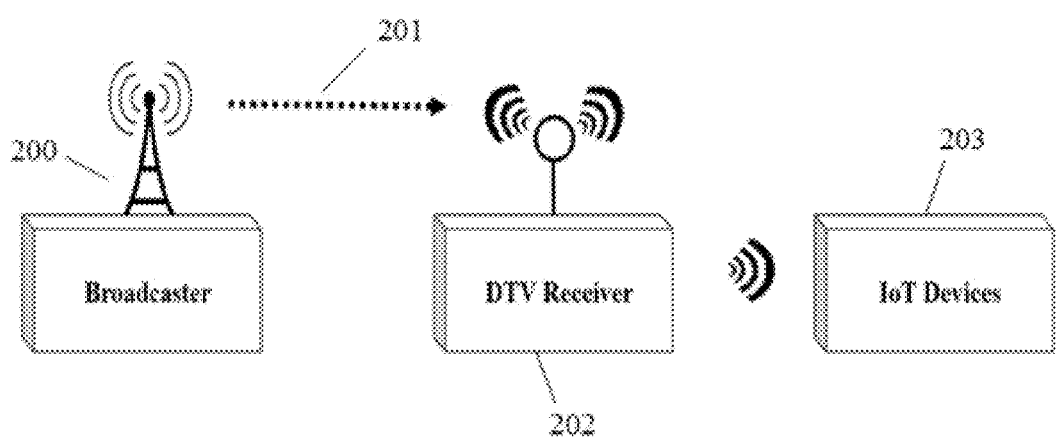
FIG. 2 discloses the signal flow involving the broadcaster, TV receiver and the IoT devices.

FIG. 2 discloses an overview of the system, since the broadcaster IoT command data transmission until TV receiver, and finally the IoT controlled devices. The broadcaster 200 transmits the transport stream 201 continuously containing PES packets carrying on IoT commands synchronized with the video stream flow. At the receiver side 202, these commands (e.g. showed above) are then extracted, processed and transmitted to all IoT devices paired with the TV device through some smart communication protocol 203. The resident application implemented on TV receiver can enable/disable this feature according to the user preferences.

Figure 3:
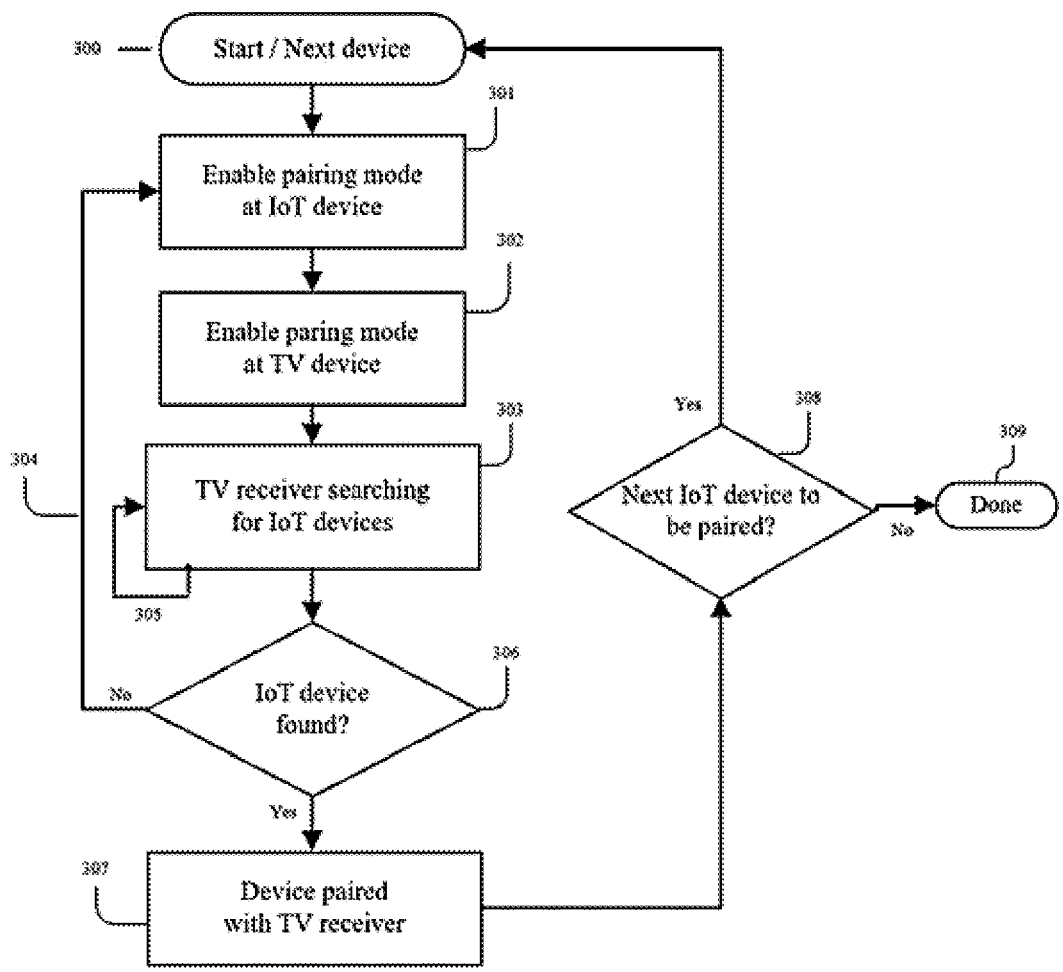
FIG. 3 discloses a TV receiver pairing with IoT devices.

FIG. 3 discloses the procedure to pair IoT devices with TV receivers. On 300, the process of pairing starts, and the execution line reaches 301 where the user can enable the pairing mode on the IoT device, which allows the device to be detected and paired with other devices using the compatible pairing technology. On 302, the user can enable the pairing mode on the TV receiver, which allows the searching for IoT devices to be paired. On 303, the TV receiver starts the searching for IoT devices to be paired and added to the list of IoT devices compatible with the TV receiver. The process of searching follows the line 305 until a given timeout. In 306, a conditional statement verifies if some IoT device was found. If not, the execution line follows through 304 reaching 301 where the process is started again. If some IoT device is found, the execution line reaches 307 where the IoT device is paired with TV receiver. The paired device is added to paired list persisted at TV device memory to be used by the communication application. After the conclusion of the pairing process for one IoT device, the execution line goes to conditional statement 308 to check if there is another IoT device to be paired. If there are no devices to be paired, the execution line reaches statement 309 and the pairing process is finished. If there are more IoT devices to be paired, the execution line follows to 300 and the pairing process is repeated again until all the IoT devices are added to the paired list.

Figure 4:
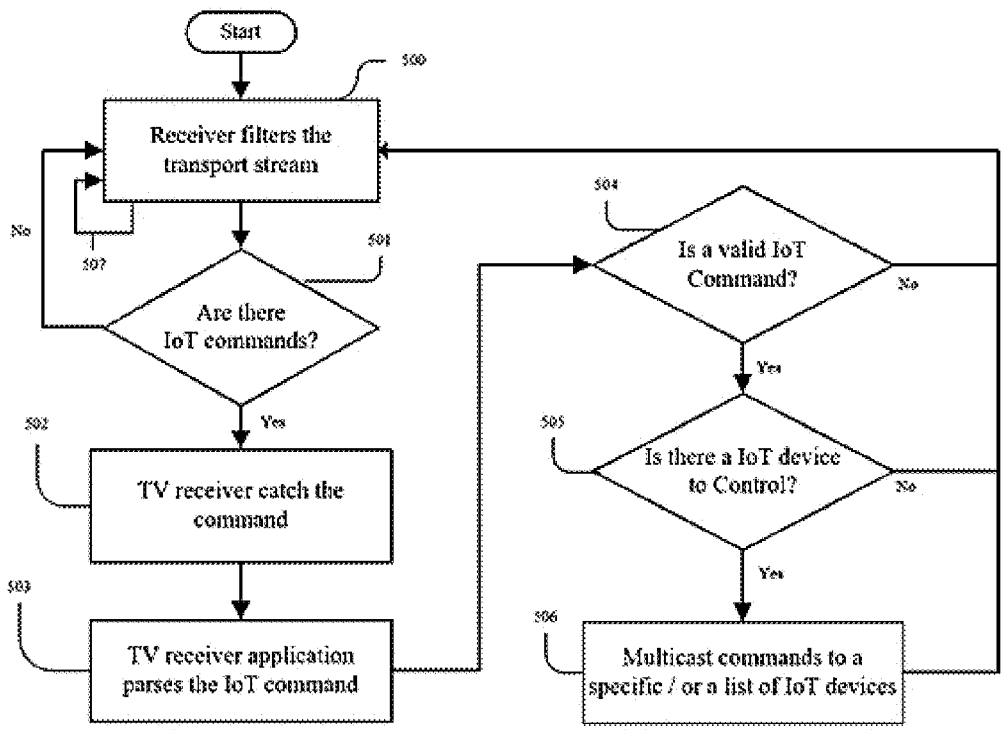
FIG. 4 discloses a receiver flow diagram to filter the command list of transport stream.

FIG. 4 discloses a flow diagram detailing how the receiver filters the IoT commands provided by transport stream and embedded at PES packets. On 500, the receiver starts the continuous filtering process to find the IoT commands inside of PES packets and multiplexed with other transport stream contents, such as data, audio and video flow. These commands arrive at the payload area of PES packets synchronized with video flow through PTS and DTS time stamps reference values added at the PES packets headers. These values will be the DTV receiver reference for the exact moment of transmission of the IoT commands synchronized with the video flow scene. The line 507 indicates that the filtering process is a loop that starts at the moment that the receiver is turned on. On 501, it is verified if there are IoT commands carried by transport stream. If there aren't commands in the transport stream, the execution line goes back to statement 500 and keeps filtering the transport stream through 507. On the other hand, if there is IoT commands, the execution line reaches 502 where the resident application at the receiver catches the command and follows to 503, that in turn, parses the IoT command. After the parser on 503, the line execution reaches 504 to check if the command is a valid command. Regarding step 504, the TV resident application can implement a security engine to check unknown commands avoiding external attacks or broadcaster errors. Although it is very difficult to have some external attack considering that the commands are only sent by the transmitter without return channel. Even that, at the application layer no information about access ports are provided. When the filtered command is not valid, the execution line goes to 500 where the process starts again, or else, reaches 505 conditional flow in which it is verified if there are IoT devices paired with the DTV receiver. Noting that it has devices for controlling, then the execution line reaches 506 and the DTV receiver transmits the command to a specific or a list of IoT devices paired with TV. The controlled IoT depends on the filtered IoT command at 502. Otherwise, on line 505, if no IoT device is paired with TV the systems just ignore the transmitted command and the execution line reaches 500 where the filter cycle is performed until a new command arrives by TS flow.

Figure 5:
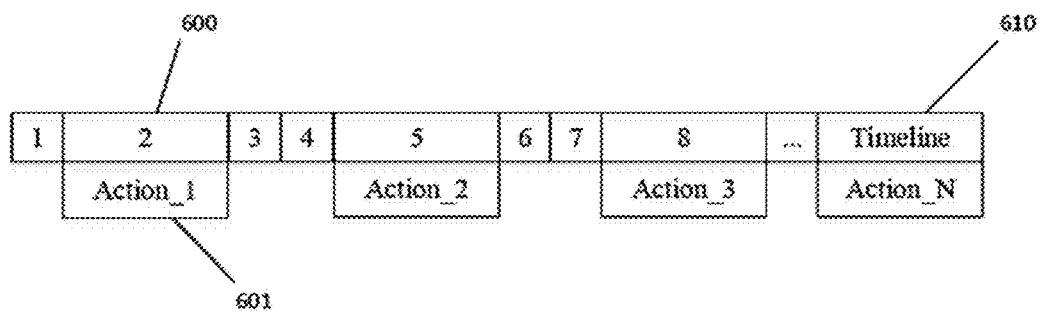
FIG. 5 discloses one exemplary use case that demonstrates the use on the timeline.

FIG. 5 shows an exemplary use case in which multiple IoT commands are broadcast at the same time in order to generate effects in multiple IoT devices. The timeline 610 represents the broadcaster linear streaming (e.g. TS) carrying the list of IoT commands that will be used to produce effects at the IoT devices. In this use case, the time 600 is associated with "action 1" represented by 601, containing the list of IoT commands in that time interval. There are many possibilities of using this control method for handling multiple devices at the same time:

<Action_1>
   011 {!WD_Hold_Tight[60%]!};
   101 {!SL_Turn_On!};
<Action_2>
   101 {!SL_Turn_Off!};
   111 {!AC_Turbo_Fan[50%]!};
   110 {!RS_Shake[100%]!};
<Action_3>
   110 {!RS_Let_Up[10%]!};
<Action_N>
   List of effects N . . .

In Action_1, a set of IoT commands are received that must be done at the same time:

The clothing must tighten the user at 60% of its strength;
The smart lamp turns on.

In Action_2, a new set of IoT commands is received from broadcast:

The smart lamp turns off;
The turbo fan of the air conditioner must increase the speed in 50%;
The chair should vibrate with maximum force.

In Action_3, a single command is received from broadcast:

The chair must recline in 10%.

Finally, the Action_N could be used to other kinds of effects depending on IoT device that will be controlled through by DTV signal.

According to a preferred embodiment of the present invention, if the DTV receiver is powered-off, the method cannot be performed because the engine only works when some channel is tuned and the broadcaster is transmitting IoT commands. For other channel, without IoT commands the engine doesn't do nothing because no content is present. As other option, user can also disable this feature through TV preferences menu.

The type of connection between DTV receiver and IoT devices may be:

1. Bluetooth—Is a wireless technology used to exchange data in short distances. It can be used to control IoT devices located near the TV device.

2. All Share—Is a communication protocol that allows to exchange data between TV devices and IoT devices through home network.

3. Smart Home Software Protocol (SHP)—Generic control protocol to IoT devices, can be used to communicate TV device with the generic IoT devices reached at the home network.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

The invention claimed is:

1. A method for controlling Internet of Things (IoT) devices with digital TV (DTV) receivers using transmission from a broadcaster in a transport stream flow comprising:
    receiving at the DTV receiver a broadcasting DTV signal from a broadcaster through a MPEG-2 transport of stream flow, wherein the DTV signal includes data added by the broadcaster and synchronized with a desirable video scene together with other data present at the Transport Stream flow;
    enabling a pairing mode on the IoT device by the user;
    enabling a pairing mode on the TV receiver by the user;
    TV receiver start searching for IoT devices to be paired and added to the list of IoT devices compatible with the TV receiver until a given timeout;
    checking if some IoT device was found,
    in a negative case, returning to the enabling pairing mode on the IoT device and processing is started again,
    in a positive case, the IoT device is paired with the TV receiver and the paired device is added to a pairing list stored at TV device memory to be used by a communication application;
    after concluding the pairing for one IoT device, checking if there is another IoT device to be paired,
    in a negative case, the pairing is finished,
    in a positive case, the pairing is repeated until all IoT devices are added to the pairing list;
    filtering IoT commands and timestamp information from the data in the DTV signal;
    synchronizing IoT commands input at the DTV receiver with the video flow through timestamps;
    broadcasting IoT commands as received from the data in the DTV signal based on digital TV technology standard to paired IoT devices connected to a home network; and
    extracting the IoT commands from the signal received through a broadcast technique on the tuned DTV channel (TS) executing,
    wherein the IoT commands are configured to control at least one of a robotic seat, a wearable device, and an air conditioner.

2. The method according to claim 1, wherein the TV receiver searching comprises using an available closed-caption channel to broadcast IoT commands sequences synchronized with video flow.

3. The method according to claim 1, wherein the TV receiver searching comprises using private sections to broadcast IoT commands sequences synchronized with video flow.

4. The method according to claim 1, wherein packetized elementary stream (PES) packets broadcast IoT commands sequences synchronized with video flow.

5. The method according to claim 1, wherein DSM-CC stream events broadcast IoT commands sequences synchronized with video flow.

6. The method according to claim 1, wherein home network IoT devices react to commands sent by the DTV receiver according to tuned TV channel and program content.

\* \* \* \* \*